United States Patent [19]
Dargols

[11] 3,814,292
[45] June 4, 1974

[54] SPRAY DISPENSER FITTED WITH A DEMINERALIZING CARTRIDGE

[76] Inventor: Bernard Dargols, 75 Rue des Monts Clairs, 92 (Hauts de Seine) Colombes, France

[22] Filed: May 19, 1972

[21] Appl. No.: 254,945

[30] Foreign Application Priority Data
June 7, 1971   France ............................. 71.20448

[52] U.S. Cl. ................................ 222/189, 222/383
[51] Int. Cl. ............................................. B67d 5/58
[58] Field of Search .................... 222/190, 189, 383; 239/394, 397, 393; 210/282; 220/29; 229/75

[56] References Cited
UNITED STATES PATENTS

| | | | |
|---|---|---|---|
| 3,266,628 | 8/1966 | Price | 210/282 X |
| 3,379,381 | 4/1968 | Dacaux | 222/383 X |
| 3,650,473 | 4/1972 | Malone | 222/383 X |
| 3,675,776 | 7/1972 | Campo | 210/282 X |
| 3,727,807 | 4/1973 | Flider | 220/29 |

FOREIGN PATENTS OR APPLICATIONS

| | | | |
|---|---|---|---|
| 795,248 | 5/1958 | Great Britain | 210/282 |
| 265,827 | 4/1950 | Switzerland | 210/282 |

*Primary Examiner*—Stanley H. Tollberg
*Assistant Examiner*—James M. Slattery
*Attorney, Agent, or Firm*—Edwin E. Greigg

[57] ABSTRACT

The container of the dispenser is divided vertically into two chambers which communicate with each other by means of a semi-immersed interchangeable cartridge containing a charge of ion-exchange resins and having openings at both ends. The top chamber is filled by hand with water to be demineralized which passes down through the cartridge and collects in the bottom chamber. The eduction tube of the dispenser extends in leak-tight manner through the partition-wall between the two chambers and through the cartridge or only through the partition-wall and has its opening near the end-wall of the bottom chamber.

3 Claims, 1 Drawing Figure

PATENTED JUN 4 1974　　3,814,292
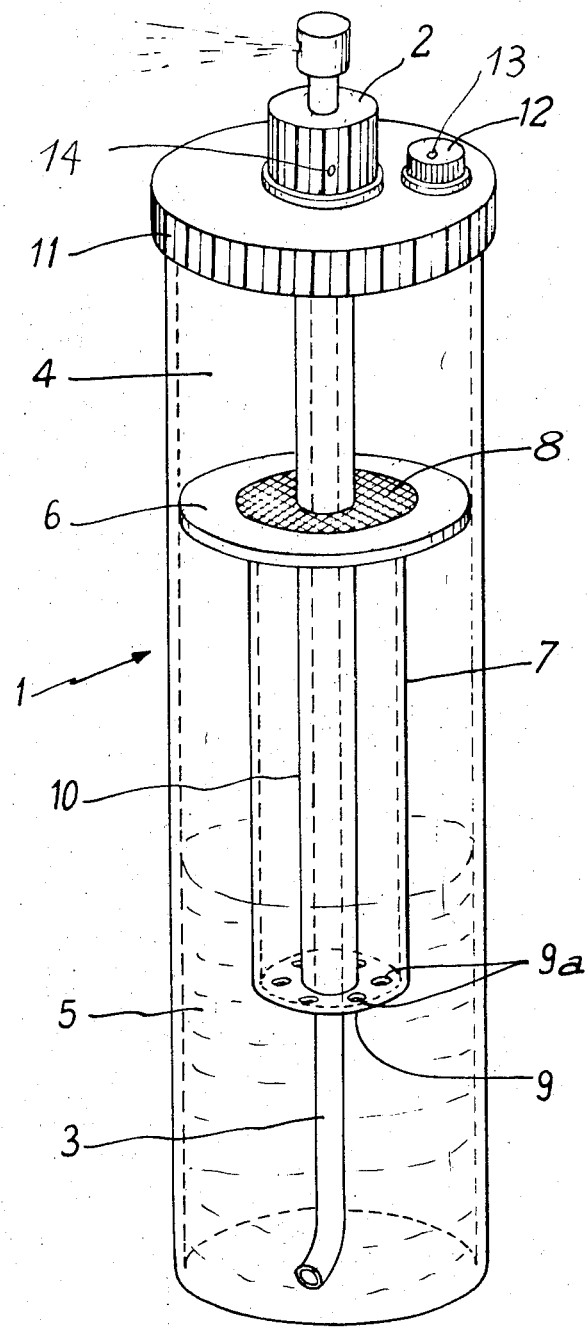

SPRAY DISPENSER FITTED WITH A DEMINERALIZING CARTRIDGE

This invention relates to demineralizing-resin flasks.

Flasks of this type are well known. They all contain a charge of ion-exchange resins so constituted as to undergo a color change as they become depleted, thus providing a means of determining the moment when replacement of the charge becomes necessary.

In nearly all flasks of this type, the charge of demineralizing resins is placed within a cartridge provided with orifices at each end. The cartridge is either fixed externally on the neck of the flask, or totally or partially immersed within the flask, in such a manner as to ensure that the water passes through the cartridge when it is withdrawn from the flask. Withdrawal of the water can be carried out simply by turning the flask upside down or, in the case of a flask which is made of any deformable plastic material or elastomer, by turning the flask upside down and deforming this latter. The arrangement just mentioned is the most commonly adopted. Handling of a flask of this kind is a matter of some difficulty and the flow rate of demineralized water as related to the rate of filtration through the cartridge is of low value.

In order that a reserve supply of demineralized water may be made available immediately and in sufficient quantity, one expedient has accordingly been devised and this consists in placing the cartridge containing the ion-exchange resins beneath the perforated bottom wall of a cup which is intended to be placed on the rim of a vessel of fairly substantial depth, in much the same manner as the filter of a coffee percolator. The water to be demineralized is then poured into the cup and the demineralized water which has passed through the cartridge under the action of gravity is collected in the vessel. Withdrawal of the water is carried out by tilting the vessel which is provided with a pouring spout for this purpose. Devices of this type are attended by a disadvantage in that the opening provided for the discharge of demineralized water puts this latter in contact with the surrounding atmosphere.

The device according to the invention is distinguished by the fact that it is constituted by a spray dispenser having a container which is divided in the vertical direction into two chambers which communicate with each other by means of an interchangeable cartridge containing ion-exchange resins and provided with orifices at both ends, the first chamber being intended to be filled by hand with water to be demineralized and the second chamber being intended to collect the water which has passed through the cartridge under the action of gravity whilst the eduction tube of the spray dispenser extends in leak-tight manner through the partition-wall between the two chambers and/or the resin cartridge and has its opening near the end-wall of the second chamber.

As an advantageous feature, the container of the spray dispenser and the cartridge are made of transparent material in order that the coloring of the resins may be examined.

The spray dispenser head preferably comprises in known manner two diametrically opposite nozzles which are put into service alternately by rotating the actuator-button through 180°, one nozzle being intended to produce a spray discharge in the form of fine droplets and the other nozzle being intended to produce a thin intermittent jet.

A clearer understanding of the invention will be gained from the following description and from the accompanying drawing in which one embodiment of the device according to the invention is shown by way of non-limitative example and in which the single FIGURE is a diagrammatic view in perspective of a spray dispenser fitted with a demineralizing cartridge.

In the drawing, a spray dispenser comprises in the conventional manner a container 1, a spray dispensing head, a blowing unit or pump 2 and an eduction tube 3 which extends to the bottom of the container 1. The container 1 is divided into two chambers 4 and 5 by means of an annular partition-wall 6 on which the upper extremity of a cartridge 7 is fitted in leak-tight manner. In the example illustrated, the cartridge 7 is a cylindrical tube which is closed at the top end by a screen 8 and at the bottom end by an end-wall 9 provided with perforations 9a.

The entire cartridge 7, including the end-wall 9 and the screen 8, is traversed in the longitudinal direction by a tube 10 having a small diameter, the top end of which extends to the vicinity of the cover 11 of the container 1. The cover 11 is fitted on the container 1 by screwing, for example, is adapted to carry the spray dispensing head 2 and has a filling orifice closed by a leak-tight cap 12. The cartridge 7 is fitted in leak-tight manner on the annular wall 6 by screwing, for example, or alternatively by means of a bayonet-type coupling with a flexible seal, thus permitting ready replacement after unscrewing of the cover 11.

The tube 10 which is axial in the example illustrated, forms a passageway for the tube 3 which extends within the container to the vicinity of the end-wall of the bottom chamber 5. The annular space of the cartridge 7 around the tube 10 is filled with anionic resins and/or cationic resins (not shown) which are suitably tinted in order that the color change should indicate depletion of the resins. In order that this color change should be visible, the container 1 or at least the bottom chamber 5 and the cartridge 7 are fabricated from a transparent material such as transparent rigid polystyrene, for example, which is preferably decorated in order to enhance the appearance of the container.

The operation of the device can readily be understood. After temporarily unscrewing the cap 12, the user fills the chamber 4 with plain water. Under the action of gravity, the water flows slowly into the chamber 5 and filters through the entire charge of the cartridge 7. In consequence, the chamber 5 contains only demineralized water which is removed from said chamber through the tube 3 by operating the spray dispensing head. It is clearly apparent that, in order to permit discharge of air as the filling is being performed, the chambers 4 and 5 communicate with the exterior through vents which may be of the baffle type and are designated respectively by the references 13 and 14.

The spray dispensing head is preferably fitted with two nozzles which can be put into service alternately at will, simply by rotating the actuator-button. One of these nozzles is of very small diameter and delivers very finely atomized droplets whilst the other nozzle is of larger diameter and delivers a thin intermittent jet.

As can be readily understood, many alternative forms can be contemplated in the arrangement of the components of the device without thereby departing from the scope of the invention. For example, in the spray dispensing head, the pump can be replaced by a rubber bulb or the like or else the spray dispensing head 2 and its eduction tube 3 can be displaced off-center with respect to the axis of the container 1, in which case the tube 10 passes through the annular wall 6 in leak-tight manner instead of passing through the entire cartridge, the effect of this arrangement being to reduce the cost price of said interchangeable cartridge to an appreciable extent.

What is claimed is:

1. A portable dispensing device for the de-mineralization and storage of limited quantities of water, comprising: a reciprocable dispensing nozzle; a portable elongated tubular container having an open end, a closed lower end and a smooth unobstructed inner wall; a cover member having a plurality of apertures, one of said apertures cooperating with said reciprocable dispensing nozzle and another of said apertures being provided for filling said container with water; a cartridge containing resin material and including a centrally disposed tubular member that extends upwardly from a perforated bottom wall of said cartridge, the cartridge being spaced from said inner wall by a substantial annular distance and from said closed lower end by a substantial linear distance to provide a substantial reservoir space for de-mineralized water which reaches said reservoir space by flowing through said resin material substantially solely under gravitational force, said reservoir space being of substantially larger volume than that of said container said tubular member extending through a top wall of said cartridge and communicating with said cover member, said cartridge further including an annular partition wall having a substantially tight sealing engagement with said inner wall of said container; a perforate member disposed between said annular partition wall and surrounding said centrally disposed tubular member, and an eduction tube having first and second ends, said tube being axially disposed, concentric with and extending through said tubular member with said first end extending into said reservoir space to a point adjacent said closed lower end and said second end terminating in communication with said dispensing nozzle.

2. A device for the de-mineralization of limited quantities of water as claimed in claim 1, wherein the cartridge has a length dimension greater than its circumference.

3. A device for the de-mineralization of limited quantities of water as claimed in claim 1, wherein the perforate member consists of a screen.

* * * * *